United States Patent
Denny et al.

[11] Patent Number: 5,897,845
[45] Date of Patent: Apr. 27, 1999

[54] ABSORBENTS

[75] Inventors: Patrick John Denny; Peter John Herbert Carnell; Brian Peter Williams, all of Darlington; Cathy Anne Woodroffe, Cleveland, all of United Kingdom

[73] Assignee: Imperial Chemical Industries PLC, United Kingdom

[21] Appl. No.: 08/693,202

[22] PCT Filed: Feb. 14, 1995

[86] PCT No.: PCT/GB95/00303

§ 371 Date: Oct. 8, 1996

§ 102(e) Date: Oct. 8, 1996

[87] PCT Pub. No.: WO95/22403

PCT Pub. Date: Aug. 24, 1995

[30] Foreign Application Priority Data

Feb. 21, 1994 [GB] United Kingdom .................. 9403260

[51] Int. Cl.⁶ ................. B01J 20/00; C01B 7/00
[52] U.S. Cl. .................. 423/210; 423/240 S; 502/415
[58] Field of Search .................................. 502/415, 414; 252/190; 423/240, 481, 488, 240 S, 210

[56] References Cited

U.S. PATENT DOCUMENTS

| | | | |
|---|---|---|---|
| 3,557,025 | 1/1971 | Emerson et al. | 252/463 |
| 5,316,998 | 5/1994 | Lee et al. | 502/415 |
| 5,505,926 | 4/1996 | Lee et al. | 423/240 R |

*Primary Examiner*—Wayne Langel

[57] ABSTRACT

Absorbent granules comprising an intimate mixture of particles of alumina trihydrate, 0.5 to 2 parts by weight of particles of a sodium component selected from the group consisting of sodium carbonate, sodium bicarbonate and mixtures thereof per part by weight of said alumina trihydrate and from 5 to 20% by weight of a binder, said alumina trihydrate, sodium component and binder being present in such proportions that, after ignition of a sample of the granules at 900° C., the sample has a sodium oxide, $Na_2O$, content of at least 20% by weight. Processes for manufacturing such absorbent granules and for using such absorbent granules for the removal of acidic gases are also disclosed.

9 Claims, No Drawings

ABSORBENTS

This invention relates to absorbents, and to a process for their manufacture, in particular to absorbents suitable for removing contaminant acidic gases such as hydrogen chloride from gas streams.

Such absorbents are typically employed as a bed through which the gas stream to be treated is continuously passed: the contaminant hydrogen chloride is absorbed by the absorbent so that the effluent gas has a relatively low hydrogen chloride content. After a period of time, the absorbent becomes loaded with absorbed hydrogen chloride until the absorbent bed is unable to reduce the hydrogen chloride content to an acceptable level: typically it is desired to have an effluent gas containing less than a specified amount, e.g 0.1 ppm by volume of hydrogen chloride. When the effluent gas contains an unacceptable proportion of hydrogen chloride, "break-through" is said to have occurred. It is normally found that, when break-through has occurred, the chloride content of the bed is somewhat less than the theoretical maximum: thus while samples taken from bed inlet region may have a chlorine content equal to or near the theoretical maximum, samples taken from the bed outlet region are liable to have a chlorine content significantly below the theoretical maximum.

One type of known absorbent for removing contaminant acidic gases such as hydrogen chloride from gas streams comprises alumina granules that have been impregnated with sodium hydroxide or carbonate and then calcined at a high temperature, at, for example above 500° C. Calcination at such temperatures causes at least some of the sodium hydroxide or carbonate to react with the alumina to form sodium aluminate.

Such absorbent granules, in which some of the sodium is present as sodium aluminate as a result of the reaction between the sodium carbonate and alumina, typically have a total sodium content (expressed as sodium oxide, $Na_2O$) of the order of 12–14% by weight as measured on a sample that has been ignited at 900° C. These absorbents exhibit acceptable activity for the absorption of hydrogen chloride at relatively high temperatures, for example of the order of 350° C., and "break-through" (giving a product gas containing more than 0.1 ppm by volume of hydrogen chloride) typically occurs when the absorbent has a total chlorine content of about 15–17% by weight. However the activity of such absorbents at low temperatures, eg below about 150° C., is limited, and the chlorine content of the bed when break-through occurs may be relatively low. For example, at ambient temperature, break-through (0.1 ppm HCl) may occur when the bed has an average chlorine content of only about 8–9% by weight.

It has been proposed in GB 1433762 to employ as an absorbent for acidic gases, activated alumina granules of a high surface area that has been impregnated with a solution of sodium carbonate, followed by evaporation of the water and heating at 120° C. In PCT publication WO 93/22049 it has been proposed to make similar absorbents by impregnating alumina with an alkali metal salt of an organic acid such as acetic acid followed by drying and calcination at 300–550° C. This latter reference suggests that absorbent granules could be made by an agglomeration technique involving feeding alumina powder to a rotating pan and spraying an aqueous solution of the alkali metal compound onto the alumina powder in the rotating pan. By this technique it is suggested that the amount of alkali that could be incorporated is such that, expressed as alkali metal oxide, the alkali content of the absorbent is up to 15% by weight of the alumina. By such an impregnation method it is not practical to produce absorbents containing more than about 15% by weight alkali, expressed as alkali metal oxide.

By utilising an alternative production process, we have found that it is possible to achieve absorbents having a much higher alkali content, and hence a greater chloride capacity. Such absorbents have significantly improved low temperature performance.

Accordingly the present invention provides absorbent granules comprising an intimate mixture of an alumina component selected from alumina and/or hydrated alumina, an alkali component selected from sodium carbonate and/or sodium bicarbonate in weight proportions of 0.5 to 2 parts of said alkali component per part of said alumina component, and a binder, said granules containing from 5 to 20% by weight of said binder and having an alkali component content such that, after ignition of a sample of the granules at 900° C., the sample has a sodium oxide, $Na_2O$, content of at least 20% by weight.

The absorbent granules preferably have an average size of at least about 2 mm, and preferably at least about 3 mm as a bed of smaller granules is liable to present an unacceptable resistance to flow of gas therethrough. Thus an unacceptably high pressure drop is experienced upon passage of the gas through a bed of small granules.

The granules preferably have a BET surface area of at least 10 $m^2/g$.

The binder may be a suitable hydraulic cement, such as calcium aluminate cement. Alternatively, and preferably, the binder comprises a clay, for example an acicular clay such as attapulgite or sepiolite.

The absorbents of the present invention may be made by granulating a mixture of alumina or a hydrated alumina such as alumina trihydrate, sodium carbonate, or, preferably, bicarbonate, and the binder, in the requisite proportions, and calcining the resultant mixture at a moderate temperature, ie below about 350° C., and preferably in the range 105–300° C. At such temperatures, it is believed that little or no decomposition of aluminium trihydrate occurs but the sodium bicarbonate is converted to sodium carbonate. X-ray diffraction examination shows the sodium present only as a sodium carbonate phase: little or no sodium aluminate is formed.

By the term granulation we mean mixing the powdered ingredients, i.e. alumina and/or hydrated alumina, sodium carbonate and/or bicarbonate, and binder, with a little wetting agent such as water, in an amount that is insufficient to form a slurry, and forming the resultant mixture into aggregates, generally of approximate spherical configuration. Such granulation techniques are well known in the art.

It is preferred to employ alumina trihydrate, rather than alumina, since granulation of compositions containing a high proportion of sodium carbonate or bicarbonate and alumina tends to present difficulties. The use of sodium carbonate, in place of sodium bicarbonate, may result in absorbents of lower surface area. Therefore we prefer to use a mixture of alumina trihydrate and sodium bicarbonate in a weight ratio in the range 1:2 to 2:1.

In order to make agglomerates of adequate strength it is desirable to employ the ingredients in a finely divided form. Typically the ingredients have an average particle size in the range 1–20 μm, preferably in the range 5–10 μm.

The invention is illustrated by the following Examples.

EXAMPLE 1

Sodium bicarbonate (8 kg), alumina trihydrate (8 kg) and attapulgite clay (1.6 kg), each in finely divided powder form having an average particle size in the range 5–10 μm, were dry mixed. Part of the mixture (about 2 kg) was charged to a Hobart mixer of 25 l capacity and stirred therein at a speed of about 60 rpm (1 Hz). Water was slowly added while stirring until the mixture adhered to form small balls or agglomerates. Further amounts of the powder mixture and water were gradually added until all the powder mixture had formed into agglomerates. The agglomerates were then sieved to reject agglomerates having a size below about 3 mm or above about 5 mm.

The remaining agglomerates were dried in air in an oven at 115° C. for 4½ hours. A sample (Sample A) of the dried agglomerates was tested as set out below. The temperature of the oven was then increased to 200° C. at a rate of 10° C./min. and maintained at 200° C. for 3 hours to effect calcination, and then a sample (Sample B) of the calcined agglomerates was also tested.

Both samples of agglomerates had a bulk density of about 0.8 g/ml and a BET surface area of about 14 m²/g. Analysis of samples of the agglomerates after ignition at 900° C. showed a sodium oxide, $Na_2O$, content of over 30% by weight.

Samples A and B were then tested for their hydrogen chloride absorption characteristics by passing methane containing about 1% by volume of hydrogen chloride at atmospheric pressure and about 20° C. down through a vertical bed of the pellets or granules of height 12 cm and height to diameter ratio of 5 at a space velocity of approximatelt 700 $h^{-1}$. The time taken before the hydrogen chloride content of the exit gas reached 1 ppm by volume was determined and is quoted in the following table as the "break-through time to 1 ppm HCl". The granules were then carefully discharged from the bed and divided into 6 portions corresponding to 2 cm bands of the bed depth. Each portion was analysed for the chloride content. The results are shown in the following table:

|  | Sample A | Sample B |
|---|---|---|
| Break-through time to 1 ppm HCl (hours) | 6 ½ | 13 ¼ |
| Chloride content (wt %) |  |  |
| Portion 1 (top) | 19.8 | 23.0 |
| Portion 2 | 15.2 | 24.3 |
| Portion 3 | 9.1 | 24.3 |
| Portion 4 | 2.9 | 23.7 |
| Portion 5 | 0.5 | 16.7 |
| Portion 6 (bottom) | 0.1 | 4.9 |

EXAMPLE 2

A test procedure similar to that of Example 1 (except that the space velocity was approximately 750 $h^{-1}$ and "breakthrough" was considered to occur when the hydrogen chloride content of the exit gas reached 10 ppm by volume) was applied to the following sorbent materials:

C Granules of particle size within the range 3 to 5 mm having a bulk density of about 0.9 g/ml and a BET surface area of about 16 g/m² made by the procedure of Example 1 using 50 parts by weight of sodium bicarbonate, 50 parts by weight of alumina trihydrate, and 10 parts by weight of attapulgite clay with the drying and calcining being effected in a single stage in a rotary drier at 145° C. Analysis of a sample of the granules that had been ignited at 900° C. showed a sodium oxide, $Na_2O$, content of about 30% by weight.

D Commercially available alumina granules of about 3 mm size impregnated with sodium carbonate and calcined at above 500° C. to give granules of bulk density about 0.75 g/ml and a BET surface area of about 113 m²/g which, after ignition at 900° C. had a sodium oxide, $Na_2O$, content of about 14% by weight.

E Commercially available activated alumina granules of about 3 mm size having a bulk density of 0.83 g/ml and a BET surface area of about 300 m²/g.

In the following table the "breakthrough time" (to 10 ppm HCl) and the chloride content of the individual portions is quoted for each sorbent material. In addition, since an important criterion is the amount of hydrogen chloride that can be absorbed by a given volume of absorbent bed, in the table the weight of chloride (kg of Cl⁻) per m³ of sorbent is calculated.

|  | Sorbent | | |
|---|---|---|---|
|  | C | D | E |
| Break-through time to 10 ppm HCl (hours) | 11 ¾ | 4 | 2 ½ |
| Chloride content (wt %) |  |  |  |
| Portion 1 (top) | 23.9 | 10.5 | 4.5 |
| Portion 2 | 24.8 | 9.3 | 5.8 |
| Portion 3 | 24.9 | 8.5 | 5.1 |
| Portion 4 | 21.9 | 7.5 | 3.4 |
| Portion 5 | 13.1 | 4.2 | 2.9 |
| Portion 6 (bottom) | 2.4 | 0.9 | 1.0 |
| Chloride absorbed (kg per m³) | 173.5 | 55.2 | 32.1 |

It is seen that the absorbent granules C of the invention had a far greater capacity for chloride than the sorbents D or E, despite the much lower BET surface area of the absorbent granules C.

We claim:

1. Absorbent granules comprising an intimate mixture of particles of alumina trihydrate, 0.5 to 2 parts by weight of particles of a sodium component selected from the group consisting of sodium carbonate, sodium bicarbonate and mixtures thereof per part by weight of said alumina trihydrate and from 5 to 20% by weight of a binder, said alumina trihydrate, sodium component and binder being present in such proportions that, after ignition of a sample of the granules at 900° C., the sample has a sodium oxide, $Na_2O$, content of at least 20% by weight.

2. Absorbent granules according to claim 1 having a BET surface area of at least 10 m²/g.

3. Absorbent granules according to claim 1 wherein the binder is a hydraulic cement or a clay.

4. The absorbent granules according to claim 1 wherein the granules have an average size of at least about 2 mm.

5. The absorbent granules according to claim 4 wherein the granules have an average size of at least about 3 mm.

6. The absorbent granules according to claim 3 wherein the hydraulic cement is calcium aluminate cement.

7. The absorbent granules according to claim 3 wherein the clay is acicular clay.

8. A process for the manufacture of absorbent granules comprising granulating a mixture of particles of a) alumina trihydrate, b) a sodium component selected from the group consisting of sodium carbonate, sodium bicarbonate and mixtures thereof, and c) a binder, and calcining the resultant granulated mixture at a temperature below 350° C., to give granules containing an intimate mixture of particles of alumina trihydrate, 0.5 to 2 parts by weight of particles of a sodium component selected from the group consisting of sodium carbonate, sodium bicarbonate and mixtures thereof per part by weight of said alumina trihydrate and from 5 to 20% by weight of the binder, said alumina trihydrate, sodium component and binder being present in such proportions that, after ignition of a sample of the granules at 900° C., the sample has a sodium oxide, Na$_2$O, content of at least 20% by weight.

9. A process for the removal of acidic gases from a gas stream comprising passing the gas stream, at a temperature below 150° C., through a bed of absorbent granules comprising an intimate mixture of particles of alumina trihydrate, 0.5 to 2 parts by weight of particles of a sodium component selected from the group consisting of sodium carbonate, sodium bicarbonate and mixtures thereof per part by weight of said alumina trihydrate and from 5 to 20% by weight of a binder, said alumina trihydrate, sodium component and binder being present in such proportions that, after ignition of a sample of the granules at 900° C., the sample has a sodium oxide, Na$_2$O, content of at least 20% by weight.

* * * * *